United States Patent [19]
Ramos et al.

[11] Patent Number: 5,811,473
[45] Date of Patent: Sep. 22, 1998

[54] PRIMER ACTIVATOR COMPOSITION FOR ANAEROBIC ADHESIVES

[75] Inventors: Jennifer M. Ramos, Berlin; Richard D. Rich, Avon, both of Conn.

[73] Assignee: Loctite Corporation, Hartford, Conn.

[21] Appl. No.: 626,738

[22] Filed: Apr. 2, 1996

[51] Int. Cl.⁶ .............................. C08K 5/54; C08F 30/04
[52] U.S. Cl. .................... 523/176; 510/256; 524/267; 524/319; 524/251; 524/252; 524/257; 524/247
[58] Field of Search ............................ 510/256; 523/176

[56] References Cited

U.S. PATENT DOCUMENTS

| | | | |
|---|---|---|---|
| 3,591,438 | 7/1971 | Toback et al. | 156/310 |
| 3,616,040 | 10/1971 | Toback | 156/310 |
| 3,625,930 | 12/1971 | Toback | 260/89.5 |
| 4,731,146 | 3/1988 | Clark | 156/314 |
| 4,771,112 | 9/1988 | Engelbrecht | 525/327.3 |
| 5,100,572 | 3/1992 | Merchant | 252/171 |
| 5,171,902 | 12/1992 | Krespan et al. | 570/175 |
| 5,194,170 | 3/1993 | Merchant et al. | 252/67 |
| 5,196,137 | 3/1993 | Merchant | 252/172 |
| 5,221,493 | 6/1993 | Merchant et al. | 252/67 |
| 5,643,982 | 7/1997 | Liu | 524/267 |

OTHER PUBLICATIONS

R. D. Rich, "Anaerobic Adhesives," in *Handbook of Adhesive Technology*, A. Pizzi & K. L. Mittal, eds., Marcel Dekker, Inc., New York, 1994, pp. 467–479.

*Primary Examiner*—Matthew V. Grumbling
*Attorney, Agent, or Firm*—Steven C. Bauman

[57] ABSTRACT

A primer activator composition useful in cleaning and activating metallic surfaces in preparation for use with an anaerobic adhesive. The composition contains a non-combustible, non-ozone depleting, liquid polyfluoroalkane having at least one carbon-hydrogen bond, preferably a $C_{4-10}$ dihydro- or trihydro-polyfluoroalkane; an alkanol which is capable of forming an azeotropic mixture with the polyfluoroalkane, preferably a $C_{1-6}$ alkanol, such as n-butanol; a transition metal compound, preferably a copper compound; and optionally, an amine co-activator.

23 Claims, No Drawings

PRIMER ACTIVATOR COMPOSITION FOR ANAEROBIC ADHESIVES

BACKGROUND OF THE INVENTION

This invention relates to a primer activator composition which can be used to clean and activate metallic surfaces prior to the application of an anaerobic adhesive, such as, a mixture of acrylic esters.

Anaerobic adhesives were recently reviewed by R. D. Rich in "Anaerobic Adhesives," Handbook of Adhesive Technology, A. Pizzi and K. L. Mittal, eds., Marcel Dekker, Inc., New York, 1994, p. 467–479. It is disclosed therein that anaerobic adhesives are mixtures of acrylic esters that remain liquid when exposed to air, but harden when confined between metal surfaces. Numerous industrial applications exist for anaerobic adhesives, including locking threaded fasteners, sealing threaded pipe connections, retaining cylindrical machine components, sealing porous metal castings and welds, and bonding structural components.

Typical anaerobic adhesive formulations contain a monomer, such as a methacrylate ester; a polymerization initiator, such as an organic hydroperoxide; an accelerator for catalyzing the anaerobic cure, such as benzoic sulfimide or an aromatic amine; a stabilizer for safe shipping and storage, such as hydroquinone or a phenol; and one or more modifiers, generally any of several chemicals which can affect the physical or chemical properties of the uncured or cured material. It is known that anaerobic adhesives cure more rapidly when the metallic surface to which the adhesive is applied has been pretreated with a primer activator, such as a transition metal salt which will catalyze the polymerization of the monomer.

Typically, a primer activator composition comprises one or more activator components in a solvent or mixture of solvents. To facilitate the production process the solvent or mixture of solvents should be readily evaporated. For safety in handling and transportation the volatile components of the primer activator composition, primarily the solvent or mixture of solvents, should be non-combustible, which means that no flash point is exhibited up to a temperature of 93° C. (200° F.). Additionally, in order to meet current environmental standards, the solvent or mixture of solvents should be non-ozone depleting.

U.S. Pat. No. 3,591,438 discloses a bonding accelerator composition which is used to speed the cure of a peroxy initiated acrylate based adhesive or sealant. The bonding accelerator, which is applied to one or more of the surfaces to be bonded, is taught to contain (a) a condensation product of an aldehyde and a primary or secondary amine, and (b) as a reducing activator, a compound containing an oxidizable transition metal. It is further disclosed to disperse or dissolve the bonding accelerator in a volatile solvent including chlorinated hydrocarbons, such as trichloro-ethane or trichloromonofluoromethane, or lacquer-type solvents, such as acetone or ethyl acetate, or aromatic hydrocarbons, such as benzene or toluene. Disadvantageously, the chlorine-containing solvents have been found to be ozone-depleting, while the lacquer-type solvents and aromatic hydrocarbons are too flammable (flash point less than 38° C./100° F.) or too combustible (flash point between 38° C./100° F. and 93° C./200° F.).

In view of the above, it would be desirable to discover a primer activator composition whose solvent system can be readily evaporated, and whose composition is both non-combustible and non- ozone depleting.

SUMMARY OF THE INVENTION

This invention is a primer activator composition comprising a non-combustible, non-ozone depleting liquid polyfluoroalkane having at least one carbon-hydrogen bond, and further comprising an alkanol which is capable of forming an azeotropic mixture with the polyfluoroalkane, and a transition metal compound. The alkanol is present in the primer activator composition in an amount ranging from about a weight percentage sufficient to dissolve the transition metal compound to about the weight percentage of the alkanol in the azeotropic mixture. The transition metal of the transition metal compound is present in the primer activator composition in an activating amount, namely, an amount which is sufficient to activate a metallic surface for use with an anaerobic adhesive. Optionally, the composition of this invention may also contain an amine co-activator in a co-activating amount. The polyfluoroalkane forms the balance of the composition.

The primer activator composition of this invention is useful for cleaning and activating metallic surfaces in preparation for use with an anaerobic adhesive. Advantageously, the preferred polyfluoroalkane and alkanol components of the composition of this invention can be readily evaporated. More advantageously, the primer activator composition of this invention meets the requirements for non-combustibility. Even more advantageously, the primer activator composition of this invention is non-ozone depleting. As a further advantage, the primer activator composition of this invention exhibits an activity which is comparable to the activity of commercial primer activator compositions which currently contain flammable or combustible or ozone depleting solvents.

DETAILED DESCRIPTION OF THE INVENTION

The primer activator composition of this invention is a liquid solution at about atmospheric pressure and within a temperature ranging from about 15° C. (59° F.) to about 35° C.(95° F.). The composition contains three essential components: a non-combustible, non-ozone depleting liquid polyfluoroalkane having at least one carbon-hydrogen bond, an alkanol which is capable of forming an azeotropic mixture with the polyfluoroalkane, and a transition metal compound. In an alternative embodiment of this invention, a fourth component may be present in the form of an amine co-activator. The alkanol is present in the primer activator composition in an amount ranging from about a weight percentage sufficient to dissolve the transition metal compound to about the weight percentage of the alkanol in the azeotropic mixture. The transition metal of the transition metal compound is present in an activating amount, namely, an amount which is sufficient to activate a metallic surface for use with an anaerobic adhesive. The amine co-activator, if used, is present in a co-activating amount. Accordingly, the polyfluoroalkane forms the balance of the composition.

In a preferred embodiment, the primer activator composition contains the following amounts of components, given as weight percentages based on the total weight of the primer activator composition: the alkanol in an amount ranging from about 2 weight percent to about the lesser of 10 weight percent or the weight percentage of the alkanol in the azeotrope; the transition metal, as distinguished from the transition metal compound, in an amount ranging from about 0.005 to about 0.50 weight percent; and the amine co-activator in an amount ranging from 0 to about 5 weight percent. The polyfluoroalkane forms the balance of the composition, and preferably, is present in an amount ranging from about 85 to about 97 weight percent.

In a more preferred embodiment of this invention the primer activator composition comprises a dihydropolyfluoroalkane or trihydropolyfluoroalkane, so named to reflect the presence of two or three carbon-hydrogen bonds, respectively; a $C_{1-6}$ alkanol which is capable of forming an azeotrope with the polyfluoroalkane; a copper compound; and optionally an amine co-activator. In an even more preferred embodiment of this invention, the dihydropolyfluoroalkane is 1,1,1,2,3,4,4,5,5,5-decafluoropentane; the alkanol is n-butanol; and the copper compound is copper 2-ethyl-hexanoate.

It is believed that the transition metal compound and the optional amine co-activator function as surface activating ingredients which prepare a metallic surface for use with an anaerobic adhesive. The polyfluoroalkane functions as a cleaning solvent and as a non-combustible and non-ozone depleting carrier for the transition metal compound and the optional amine co-activator. The alkanol is required to enhance the solubility of the transition metal compound and the amine co-activator in the polyfluoroalkane.

The polyfluoroalkane employed in the primer activator composition of this invention is a saturated organic compound formed from carbon, hydrogen, and fluorine atoms. It is particularly noted that chlorine atoms are not present in these compounds. The carbon atoms may be arranged in a straight-chain or branched configuration. The compound preferably possesses from one to about four carbon-hydrogen bonds and a plurality of carbon-fluorine bonds. Additionally, the polyfluoroalkane should possess several advantageous properties. First, it should be a liquid at about atmospheric pressure and within a temperature ranging from about 15° C. (59° F.) to about 35° C. (95° F). Second, the polyfluoroalkane should be non-combustible, meaning that the compound exhibits no flash point at any temperature up to 93° C. (200° F.). Such polyfluoroalkanes can also be described as non-flammable, because flammable compounds exhibit a flash point at a temperature less than or equal to 38° C. (100° F.). Third, the polyfluoroalkane should be non-ozone depleting, by which it is meant that the compound shows an essentially zero ozone depletion potential. Information pertaining to ozone depletion potentials can be obtained from the manufacturers and suppliers of polyfluoroalkanes.

Preferred polyfluoroalkanes contain from about 4 to about 10 carbon atoms. More preferably, the polyfluoroalkane is a C4–10 dihydropolyfluoroalkane or C4–10 trihydropolyfluoroalkane having, as the names specify, two or three carbon-hydrogen bonds. Non-limiting examples of suitable $C_{4-10}$ dihydropolyfluoroalkanes include octafluorobutane, decafluoropentane, dodecafluorohexane, and tetradecafluoroheptane. Non-limiting examples of suitable C4–10 trihydropolyfluoroalkanes include nonafluoropentane, undecafluorohexane, and tridecafluoroheptane. Even more preferably, the dihydropolyfluoroalkane is a $C_5$ dihydropolyfluoroalkane, most preferably, the isomer 1,1,1,2,3,4,4,5,5,5-decafluoropentane. A preferred source of this compound is Vertrel XF® brand 1,1,1,2,3,4,4,5,5,5-decafluoropentane available from the DuPont Company.

Dihydropolyfluoroalkanes, their syntheses, and properties, have been described in U.S. Pat. No. 5,100,572; U.S. Pat. No. 5,171,902; U.S. Pat. No. 5,194,170; U.S. Pat. No. 5,196,137; and U.S. Pat. No. 5,221,493, relevant sections of which are incorporated herein by reference. By way of example, the polyfluoroolefin 1,1,1,2,3,4,4,5,5,5-decafluoro-2,3-pentene can be prepared by reacting hexafluoropropene with tetrafluoroethylene in the presence of a catalyst of formula $AIX_3$ where X is one or more of fluorine, chlorine, or bromine, provided that X is not entirely fluorine. The decafluoropentene can then be hydrogenated in the vapor phase over a metal catalyst, such as palladium, to yield the dihydropolyfluoroalkane 1,1,1,2,3,4,4,5,5,5-decafluoropentane. In an analogous manner other dihydropolyfluoroalkanes can be prepared from the appropriate starting perfluoroolefins. Trihydropolyfluoroalkanes have been disclosed in U.S. Pat. Nos. 5,100,572 and 5,171,902, cited hereinabove. Monohydropolyfluoroalkanes and tetrahydropolyfluoroalkanes may be prepared by hydrofluorination or other reactions of the aforementioned di- and trihydro-polyfluoroolefins.

It is a feature of this invention that the polyfluoroalkane is used in combination with an alkanol. Any alkanol can be employed which forms an azeotrope with the polyfluoroalkane and which can solubilize the transition metal compound. Preferred alkanols include $C_{1-6}$ monoalkanols which are readily volatilized, including methanol, ethanol, propanol, isopropanol, n-butanol, and 3-methyl-1-butanol. More preferred is n-butanol.

Those skilled in the art will recognize that an azeotropic mixture is a constant boiling, or substantially constant boiling, liquid admixture of two or more substances which behaves like a single substance. One way to identify an azeotropic composition is that the vapor produced by the evaporation or distillation of the liquid mixture has substantially the same composition as the liquid mixture itself. Said another way, the admixture distills/refluxes without substantial composition change. Moreover, the azeotropic mixture exhibits either a maximum or minimum boiling point as compared with the boiling point of non-azeotropic mixtures of the same substances. Preferably, the polyfluoroalkane and alcohol mixtures needed for this invention form an azeotrope and exhibit a constant boiling composition at about atmospheric pressure and at a temperature ranging from about 40° C. to about 60° C., more preferably, from about 47° C. to about 56° C.

The azeotropic mixture of the polyfluoroalkane and the alkanol provide several advantages in primer activator compositions. At the azeotropic composition the optimal balance is achieved between non-combustibility and solubilization of the transition metal component. Mixtures of polyfluoroalkane and alkanol which contain a lower percentage of alkanol than exists in the azeotropic mixture are also suitable for the composition of this invention, so long as there is adequate solubility for the transition metal component. The lower limit on the concentration of the alkanol varies with the specific alkanol and specific transition metal compound employed, but generally this lower limit is about 2 weight percent, based on the total weight of the primer activator composition. Below this limit the solubility of the transition metal component may be too low. Mixtures of the polyfluoroalkane and alkanol which contain a higher percentage of alkanol than exists in the azeotropic mixture may also be suitable for the composition of this invention, but it is noted that such mixtures may exhibit increased combustibility or flammability. The preferred upper limit on the concentration of the alkanol in the primer activator composition varies depending upon the particular alkanol employed, but preferably the upper limit is the lesser of about 10 weight percent or the weight percentage of the alkanol in the azeotropic mixture.

Among the preferred co-solvent compositions, including the azeotropic composition at about atmospheric pressure, which can be used to prepare the primer activator composition of this invention are the following:

from about 2 to about 4 weight percent ethanol and from about 96 to about 98 weight percent 1,1,1,2,3,4,4,5,5,5-decafluoropentane;

from about 2 to about 5 weight percent isopropanol and from about 95 to about 98 weight percent 1,1,1,2,3,4,4,5,5,5-decafluoropentane; and from about 2 to about 7 weight percent n-butanol and from about 93 to about 98 weight percent 1,1,1,2,3,4,4,5,5,5-decafluoropentane; most preferably, from about 5.0 to about 6.5 weight percent n-butanol to about 93.5 to about 95.0 weight percent 1,1,1,2,3,4,4,5,5,5-decafluoropentane.

Any transition metal compound can be used to prepare the composition of this invention provided that the transition metal compound is soluble in the polyfluoroalkane-alkanol mixture and also exhibits reactivity as a primer activator. Reactivity is measured by the speed of cure of the acrylic adhesive. If the speed of cure is increased in the presence of the transition metal compound, as compared with its absence, then the transition metal compound can be used as an activating component. The transition metals are those metals which have their valence electrons in a "d" subshell. Included in this group are the metals of Groups 3, 4, 5, 6, 7, 8, 9, 10, and 11 of the Periodic Table of the Elements, as referenced in the CRC Handbook of Chemistry and Physics, 75th Ed., CRC Press, Inc., 1994, p. 1–15. Preferred transition metals include copper, chromium, manganese, iron, cobalt, nickel, and molybdenum. More preferred is copper. The oxidation state of the transition metal is not particularly critical, but the presence of a lower oxidation state which can be oxidized is somewhat preferred.

The transition metal compound may be in the form of an inorganic or organometallic compound, including oxides, salts, and organometallic chelates and complexes. Suitable inorganic salts include the sulfates, nitrates, chlorides, bromides, phosphates, and sulfides. Suitable organic salts include the alkoxides, for example, the methoxides and ethoxides, as well as the carboxylates, including the acetates, hexoates, octoates, ethylhexanoates, and naphthenates. Other suitable transition metal complexes include the acetylacetonates and the hexafluoroacetylacetonates. More preferably, the transition metal compound is selected from the group consisting of copper 2-ethylhexanoate, copper acetate, copper naphthenate, copper octoate, copper hexoate, and copper hexafluoroacetylacetonate. Most preferably, the transition metal compound is copper 2-ethylhexanoate.

The transition metal compound may be added to the alkanol or the polyfluoroalkane-alkanol mixture as a solid or dissolved in solution. Any solvent which can dissolve the transition metal compound may be used provided that the solvent is miscible with the polyfluoroalkane-alkanol mixture, provided the solvent does not significantly affect the properties of that mixture, and provided the solvent can be readily evaporated. Suitable solvents for dissolving the transition metal compound include alcohols, ketones, and carboxylic acids, but other suitable organic solvents may be found. Preferably, a minimum amount of solvent is used to dissolve the transition metal compound. A quantity of solution containing the transition metal compound is used which yields the desired concentration of transition metal in the primer activator composition. Preferably, the quantity of solution containing the transition metal compound is no more than about 5 weight percent of the total primer activator composition.

A particularly beneficial solvent which can be employed to dissolve the transition metal compound is 2-ethylhexanoic acid. Even more beneficial is the use of a solution of 2-ethylhexanoic acid containing a transition metal 2-ethylhexanoate salt, most advantageously, copper 2-ethylhexanoate in 2-ethylhexanoic acid. Copper 2-ethylhexanoate can be prepared by reacting 2-ethylhexanoic acid with copper carbonate. Typical conditions include heating the copper carbonate in a three-fold molar excess of 2-ethylhexanoic acid at about 90° C. for about 2 hours.

The concentration of the transition metal (as distinguished from the transition metal compound) in the primer activator composition may be any concentration which exhibits an activating effect on the metallic surface to be treated with the anaerobic adhesive. Generally, the concentration of the transition metal ranges from about 0.005 to about 0.50 weight percent, preferably, from about 0.01 to about 0.25 weight percent, and most preferably, from about 0.03 to about 0.10 weight percent, based on the total weight of the primer activator composition.

Optionally, an amine co-activator may be employed in the composition of this invention. Suitable amines include, but are not limited to, primary amines represented by the formula $RNH_2$, secondary amines represented by the formula $R_2NH$, and tertiary amines represented by the formula $R_3N$, wherein each R is independently selected from the group consisting of alkyl, aryl, alkaryl, or aralkyl radicals, preferably, $C_{1-10}$ alkyl, $C_{6-10}$ aryl, $C_{7-15}$ alkaryl, and $C_{7-15}$ aralkyl radicals. Non-limiting examples of suitable amine co-activators include tri-n-butylamine, dimethyl-p-toluidine, dimethyl-o-toluidine, diethyl-p-toluidine, and di-2-hydroxyethyl-p-toluidine. Preferably, the amine is tri-n-butylamine. Typically, the quantity of amine co-activator in the primer activator composition ranges from about 0 to about 5 weight percent, and preferably, from about 0 to about 1 weight percent. It is noted that the amine co-activator may exist in the primer activator composition in a free form, namely unbound to any other molecule, or alternatively, in a complexed form, that is, bound for example to the transition metal.

The composition of this invention can be prepared by simply adding the components of the composition in any order to each other and mixing well. Preferably, the transition metal compound, as a solid or in a solution, is dissolved in at least a portion of the alkanol, and the resulting solution is added to the polyfluoroalkane. The amine co-activator, if used, may be added at any stage. Stirring and other forms of agitation are usually employed to facilitate the mixing process. The mixing is usually conducted at ambient pressure and ambient temperature, but temperatures up to about 35° C. are also acceptable. Generally, it is not necessary to shield the transition metal compound or the co-activator amine from oxygen during the preparation process, but sparging or blanketing the preparative mixture with a non-reactive gas may be beneficially employed in instances wherein the transition metal compound or the amine exhibits too much air sensitivity. Non-reactive gases suitable for sparging or blanketing purposes include nitrogen, helium, and argon.

The primer activator composition, prepared as described hereinabove, can be applied to a bonding surface by any conventional means, such as by dipping the surface in a container or vat containing the primer activator composition or by spraying the surface with the primer activator composition or by wiping or brushing the composition onto the surface with an applicator. Spraying is preferred, because a thin uniform layer of primer activator composition is easily applied while a maximum rate of solvent vaporization is achieved. Spraying can be effected with or without a carrier aerosol. Non-limiting examples of suitable bonding surfaces include zinc-plated and cadmium-plated surfaces and stainless steel. The amount of primer activator composition to be applied to the surface should provide a thin film and usually no more than is necessary to obtain efficient acceleration of the bonding operation. Excess accelerator on one or more of the bonded surfaces may affect the strength of the final bond. For most purposes it is satisfactory to use an amount of primer activator composition which is equal to or less than about 5 weight percent of the amount of adhesive used. After the primer activator composition is applied, the wetted surface is allowed to dry, generally in air, for a short period of time, typically from about 30 seconds to about 5 minutes. It is noted, however, that the primer activator composition usually has an on-part lifetime of up to about 30 days.

The anaerobic adhesives contemplated for use with the primer activator composition disclosed herein typically comprise acrylate monomers admixed with a peroxy initiator. These adhesives remain stable in the presence of air (oxygen), but polymerize to form hard, durable resins when air or oxygen is removed, and they are particularly adaptable to the bonding of metals and other non-porous or non air-permeable materials. Of particular utility as adhesive materials are polymerizable di- and other polyacrylate esters. Non-limiting examples of suitable monoacrylate ester monomers include isobutyl methacrylate, cyanoethyl acrylate, hydroxyethyl methacrylate, hydroxypropyl methacrylate, and cyclohexyl acrylate. Non-limiting examples of suitable polymerizable polyacrylate esters include di-, tri-, and tetraethylene glycol dimethacrylate, dipropylene glycol dimethacrylate, polyethylene glycol dimethacrylate, as well as ethoxylated bisphenol A dimethacrylate. Also included as suitable acrylate esters are those formed by the reaction of an acrylate ester containing an active hydrogen atom in the alcoholic portion of the ester with an organic isocyanate. These and other suitable acrylate esters, including urethane acrylates, etc., and their formulations with organic peroxide polymerization initiators, stabilizers, and modifiers are more fully described in the following U.S. Pat. No. 3,591,438; U.S. Pat. No. 3,218,305; U.S. Pat. No. 4,018,851; U.S. Pat. No. 3,993,815; U.S. Pat. No. 3,925,988; and U.S. Pat. No. 4,309,526, relevant sections of which are incorporated herein by reference. Commercial anaerobic adhesive compositions are widely available.

The following examples illustrate various aspects of the composition of this invention, including the currently best known method of making and using the composition. These examples, however, are not intended to limit the scope of the invention in any manner. Unless otherwise stated, all percentages in the examples are on a weight percent basis.

Examples 1–3

Three primer activator compositions (Examples 1–3) were prepared under air at ambient temperature and atmospheric pressure in the following general manner. A predetermined amount of a copper solution containing 39 percent copper 2-ethylhexanoate and 61 percent 2-ethylhexanoic acid was dissolved in a selected alkanol. The resulting solution was added to 1,1,1,2,3,4,4,5,5,5-decafluoropentane (Vertrel XF® brand, DuPont). Tri-n-butylamine was added to the mixture, and the mixture was thoroughly stirred to form a homogeneous solution comprising the primer activator composition. The identity of the components and the weight percentage of each component are set forth for Examples 1–3 hereinafter:

Example 1: n-butanol, 6.0; copper solution, 1.1; tributylamine, 0.4; decafluoropentane, 92.5;

Example 2: n-butanol, 4.6; copper solution, 0.5; tributylamine, 0.4; decafluoropentane, 94.5;

Example 3: ethanol, 4.0; copper solution, 0.4; tributylamine, 0.4; decafluoropentane, 95.2;

The concentration of copper in the final compositions is as follows: Example 1, 0.08 percent; Example 2, 0.04 percent; Example 3, 0.03 percent.

The primer activator composition was applied to the test specimen by pump spraying. The test specimen was set on a clean absorbent material oriented in such a manner so that the primed/activated surface did not contact the absorbent material. Following the application of the primer activator, the specimens were dried in air for 3 minutes.

The primed/activated specimens were then tested by Loctite Corporation Standard Testing Method (STM) 734. The test specimens consisted of (a) ⅜ inch diameter, 24 threads per inch, cadmium or zinc plated, grade 2 nuts and bolts, and (b) ⅜ inch, 16 threads per inch, cadmium or zinc dichromate plated, grade 2 nuts and grade 5 bolts. Three specimens of each type were used with each primer activator composition. Loctite Grade A brand and Loctite Threadlocker 290 brand anaerobic acrylic adhesives were used. The adhesive was applied to the threaded portion of the bolt, and the bolt was immediately assembled with the mating nut. The nut was moved slightly every few seconds or minutes, and the time was recorded when such movement was not possible by hand (when finger tight for 3 consecutive assemblies). This time is defined as the "fixture time". The fixture times which were measured for Examples 1, 2, and 3 are set forth in Table 1.

TABLE 1

| | Fixture Time | | | |
|---|---|---|---|---|
| | Grade A 3/8 × 24 Nuts/Bolts | | Threadlocker 290 3/8 × 16 Nuts/Bolts | |
| Primer Activator | Cadmium | Zinc | Cadmium | Zinc |
| Primer N | >30 ≦ 35 m | >30 ≦ 35 m | >60 ≦ 75 s | >75 ≦ 90 s |
| Example 1 | >30 ≦ 35 m | >30 ≦ 35 m | >45 ≦ 60 s | >75 ≦ 90 s |
| Example 2 | >30 ≦ 35 m | >40 ≦ 45 m | >45 ≦ 60 s | >75 ≦ 90 s |
| Example 3 | >30 ≦ 35 m | >40 ≦ 45 m | >60 ≦ 75 s | >105 ≦ 120 s | s = seconds; m = minutes

The torque strength of the cadmium and zinc plated ⅜×24 Grade 2 nuts/ bolts was also tested with Loctite Grade A adhesive using the procedures of Loctite STM 716. The equipment and method used to measure the torque strength were the same as described by E. Maandi and R. Rich in *Scientific Computing and Automation*, Vol.11 (#8), 1994, 23–27. Five replicates of each composition were tested. Breakaway torque is defined as the initial torque required to break the bond measured at the first movement between the nut and bolt when unscrewing an unseated assembly. Prevailing torque is defined as the average of torque readings measured between 25° and 360° rotation of the nut after the initial breakage of the bond. Results are set forth in Table 2.

TABLE 2

| | | Torque Strength (inch lbs) | | | |
|---|---|---|---|---|---|
| | | 6 Hour Cure | | 24 Hour Cure | |
| Activator | Torque | Cadmium | Zinc | Cadmium | Zinc |
| Primer N | Break | 42 ± 6 | 50 ± 8 | 52 ± 24 | 52 ± 9 |
| | Prevail | 123 ± 28 | 123 ± 14 | 120 ± 32 | 153 ± 19 |
| Ex. 1 | Break | 55 ± 8 | 42 ± 15 | 46 ± 8 | 62 ± 8 |

TABLE 2-continued

| | | Torque Strength (inch lbs) | | | |
|---|---|---|---|---|---|
| | | 6 Hour Cure | | 24 Hour Cure | |
| Activator | Torque | Cadmium | Zinc | Cadmium | Zinc |
| | Prevail | 139 ± 29 | 116 ± 14 | 101 ± 37 | 141 ± 23 |
| Ex.2 | Break | 48 ± 12 | 56 ± 9 | 47 ± 10 | 51 ± 7 |
| | Prevail | 141 ± 33 | 131 ± 23 | 96 ± 46 | 141 ± 12 |
| Ex.3 | Break | 40 ± 10 | 44 ± 8 | 40 ± 8 | 47 ± 5 |
| | Prevail | 112 ± 40 | 137 ± 17 | 132 ± 13 | 149 ± 23 |

Tested at 10 rpm on an automated torque tester. Test program used average prevail torque from 25° to 360°.

The torque strength of the cadmium and zinc dichromate plated ⅜×16 Grade 2 nuts/ Grade 5 bolts was also tested by Loctite STM 717. Five replicates of each composition were tested using Loctite Threadlocker 290 adhesive with the results shown in Table 3.

TABLE 3

| | | Torque Strength (inch lbs) | | | |
|---|---|---|---|---|---|
| | | 15 Minute Cure | | 4 Hour Cure | |
| Activator | Torque | Cadmium | Zinc | Cadmium | Zinc |
| Primer N | Break | 68 ± 11 | 54 ± 6 | 78 ± 11 | 53 ± 12 |
| | Prevail | 206 ± 48 | 169 ± 35 | 270 ± 28 | 152 ± 20 |
| Ex. 1 | Break | 67 ± 10 | 63 ± 23 | 78 ± 15 | 78 ± 28 |
| | Prevail | 202 ± 59 | 188 ± 19 | 264 ± 35 | 181 ± 51 |
| Ex.2 | Break | 61 ± 10 | 51 ± 3 | 79 ± 11 | 67 ± 35 |
| | Prevail | 214 ± 42 | 131 ± 20 | 227 ± 27 | 179 ± 48 |
| Ex.3 | Break | 75 ± 10 | 50 ± 14 | 79 ± 11 | 55 ± 24 |
| | Prevail | 227 ± 29 | 147 ± 18 | 171 ± 72 | 179 ± 32 |

Tested at 10 rpm on an automated torque tester. Test program used average prevail torque from 25° to 360°.

Comparative Experiment 1

For comparative purposes, the fixture time and torque strengths were measured under identical experimental conditions as described in the Examples above, with the exception that a commercial primer activator composition (Loctite brand Primer N) comprising a copper salt in 1,1,1-trichloroethane was employed in place of the primer activator compositions of Examples 1–3. Results are set forth in Tables 1–3 in the rows labeled "Primer N". When the results of Examples 1–3 are compared with the results of Comparative Experiment 1, it is seen that the fixture times and torque strengths of the specimens treated with the composition of this invention are comparable to the fixture times and torque strengths observed with the specimens treated with the commercial standard.

What is claimed is:

1. A one-part primer activator composition comprising:
   a) a non-combustible, non-ozone depleting liquid polyfluoroalkane having at least one carbon-hydrogen bond,
   (b) an alkanol which is capable of forming an azeotropic mixture with the polyfluoroalkane,
   (c) a transition metal compound, and
   (d) optionally, an amine co-activator; wherein
      (i) the alkanol is present in an amount ranging from a weight percentage sufficient to solublize the transition metal compound to about the weight percentage of the alkanol in the azeotropic mixture,
      (ii) the transition metal of the transition metal compound is present in an activating amount,
      (iii) the optional amine co-activator is present in a co-activating amount, and
      (iv) the balance of the composition is the polyfluoroalkane.

2. The composition of claim 1 wherein the polyfluoroalkane is a $C_{4-10}$ dihydropolyfluoroalkane or a $C_{4-10}$ trihydropolyfluoroalkane.

3. The composition of claim 1 wherein the polyfluoroalkane is selected from the group consisting of octafluorobutane, decafluoropentane, dodecafluorohexane, tetradecafluoroheptane, nonafluoropentane, undecafluorohexane, and tridecafluoroheptane.

4. The composition of claim 1 wherein the polyfluoroalkane is 1,1,1,2,3,4,4,5,5,5-decafluoropentane.

5. The composition of claim 1 wherein the amount of polyfluoroalkane ranges from about 85 to about 97 weight percent, based on the total weight of the primer activator composition.

6. The composition of claim 1 wherein the alkanol is a $C_{1-6}$ monoalkanol.

7. The composition of claim 6 wherein the alkanol is selected from the group consisting of methanol, ethanol, isopropanol, n-butanol, and 3-methyl-1-butanol.

8. The composition of claim 1 wherein the amount of alkanol in the primer activator composition ranges from about 2 weight percent to about the lesser of 10 weight percent or the weight percentage of the alkanol in the azeotropic mixture.

9. The composition of claim 8 wherein the alkanol is n-butanol in a amount ranging from about 2 to about 7 weight percent, based on the total weight of the primer activator composition.

10. The composition of claim 1 wherein the transition metal compound is an oxide, salt,or organometallic complex containing a metal selected from the group consisting of manganese, cobalt, iron, copper, nickel, and molybdenum.

11. The composition of claim 10 wherein the transition metal compound is a compound of copper.

12. The composition of claim 11 wherein the transition metal compound is copper 2-ethylhexanoate, optionally dissolved in 2-ethyl-hexanoic acid.

13. The composition of claim 1 wherein the concentration of the transition metal ranges from about 0.005 to about 0.50 weight percent, based on the total weight of the primer activator composition.

14. The composition of claim 1 wherein an amine co-activator is employed.

15. The composition of claim 14 wherein the amine co-activator is selected from the group consisting of tri-n-butylamine, dimethyl-p-toluidine, dimethyl-o-toluidine, diethyl-p-toluidine, and di-2-hydroxyethyl-p-toluidine.

16. The composition of claim 1 wherein the quantity of amine co-activator ranges from about 0 to about 5 weight percent, based on the total weight of the primer activator composition.

17. A primer activator composition comprising a non-combustible, non-ozone depleting liquid $C_{4-10}$ dihydropolyfluoroalkane or $C_{4-10}$ trihydropolyfluoroalkane, a $C_{1-6}$ alkanol which is capable of forming an azeotropic mixture with the polyfluoroalkane in an amount ranging from about 2 weight percent to an amount which is the lesser of about 10 weight percent or the weight percentage of the alkanol in the azeotropic mixture, a copper compound in an amount such that the copper concentration ranges from about 0.005 to about 0.50 weight percent, and optionally, an amine co-activator in an amount ranging from 0 to about 5 weight percent, the balance of the composition being the polyfluoroalkane.

18. The primer activator composition of claim 17 wherein the dihydropolyfluoroalkane is 1,1,1,2,3,4,4,5,5,5-decafluoropentane, the alkanol is n-butanol in an amount ranging from about 2 to about 7 weight percent, the copper compound is copper 2-ethylhexanoate in an amount such that the quantity of copper ranges from about 0.03 to about 0.10 weight percent, and wherein the optional amine is tri-n-butylamine in an amount ranging from 0 to about 5 weight percent; the balance of the composition being the decafluoropentane.

19. A process of priming and activating a metallic surface for use with an anaerobic adhesive comprising applying the primer activator composition of claim 1 to the metallic surface.

20. The process of claim 19 wherein the anaerobic adhesive is selected from the group consisting of polyethylene glycol dimethacrylate, hydroxyethylmethacrylate, hydroxypropylmethacrylate, ethoxylated bisphenol A dimethacrylate, and urethane acrylates.

21. The composition according to claim 1, wherein the polyfluoroalkane is decafluoropentane in the amount of 92.5 weight percent, the alkanol is n-butanol in the amount of about 6 weight percent, the transition metal compound is copper 2-ethylhexanoate dissolved in 2-ethylhexanoic acid in a 39:61 weight percent ratio dissolved in n-butanol in the amount of 1.1 weight percent, and the amine co-activator is tributylamine in the amount of 0.4 weight percent.

22. The composition according to claim 1, wherein the polyfluoroalkane is decafluoropentane in the amount of 94.5 weight percent, the alkanol is n-butanol in the amount of about 4.6 weight percent, the transition metal compound is copper 2-ethylhexanoate dissolved in 2-ethylhexanoic acid in a 39:61 weight percent ratio dissolved in n-butanol in the amount of 0.5 weight percent, and the amine co-activator is tributylamine in the amount of 0.4 weight percent.

23. The composition according to claim 1, wherein the polyfluoroalkane is decafluoropentane in the amount of 95.2 weight percent, the alkanol is ethanol in the amount of about 4.0 weight percent, the transition metal compound is copper 2-ethylhexanoate dissolved in 2-ethylhexanoic acid in a 39:61 weight percent ratio dissolved in ethanol in the amount of 0.4 weight percent, and the amine co-activator is tributylamine in the amount of 0.4 weight percent.

* * * * *

UNITED STATES PATENT AND TRADEMARK OFFICE
CERTIFICATE OF CORRECTION

PATENT NO. : 5,811,473
DATED : September 22, 1998
INVENTOR(S) : Ramos et al.

It is certified that error appears in the above-identified patent and that said Letters Patent is hereby corrected as shown below:

On the title page: Item [54] and Column 1, line 3, now reads     "PRIMER ACTIVATOR COMPOSITION FOR ANAEROBIC ADHESIVES", should read     --A PRIMER ACTIVATOR COMPOSITION FOR ANAEROBIC ADHESIVES--.

Column 3, Line 43,     now reads     "C4-10 dihydropolyfluoroalkane or C4-10"

should read     -- $C_{4-10}$ dihydropolyfluoroalkane or $C_{4-10}$--.

Column 3, Line 49,     now reads     "Suitable C4-10"

should read     "suitable $C_{4-10}$

Signed and Sealed this

Thirtieth Day of March, 1999

Attest:

Q. TODD DICKINSON

*Attesting Officer*      Acting Commissioner of Patents and Trademarks